United States Patent
Carter

(10) Patent No.: US 8,915,024 B2
(45) Date of Patent: Dec. 23, 2014

(54) MULTI-POSITION HUNTING BLIND WINDOW

(71) Applicant: Alan T. Carter, Sturgis, MI (US)

(72) Inventor: Alan T. Carter, Sturgis, MI (US)

(73) Assignee: Carter Associates, Inc., Burr Oak, MI (US)

( * ) Notice: Subject to any disclaimer, the term of this patent is extended or adjusted under 35 U.S.C. 154(b) by 0 days.

(21) Appl. No.: 13/768,160

(22) Filed: Feb. 15, 2013

(65) Prior Publication Data

US 2014/0230344 A1 Aug. 21, 2014

(51) Int. Cl.
- *E04H 1/00* (2006.01)
- *A01M 31/02* (2006.01)
- *E04H 1/12* (2006.01)

(52) U.S. Cl.
CPC ............ *A01M 31/025* (2013.01); *E04H 1/1205* (2013.01); *Y10S 135/901* (2013.01)
USPC .................... 52/64; 52/79.1; 135/95; 135/901

(58) Field of Classification Search
CPC ....... E04H 1/12; E04H 15/001; E04H 15/008; E04H 15/32; E04H 15/58
USPC .............. 52/79.1, 64, 69, 76, 78, 204.1, 206; 135/95, 121, 117, 901, 905; 43/1; 160/136, 137
See application file for complete search history.

(56) References Cited

U.S. PATENT DOCUMENTS

| | | | | |
|---|---|---|---|---|
| 3,690,334 | A * | 9/1972 | Miller | 135/123 |
| 4,794,717 | A * | 1/1989 | Horsmann | 43/1 |
| 7,743,781 | B2 * | 6/2010 | Slaughter | 135/117 |
| 2003/0196690 | A1 * | 10/2003 | Chu et al. | 135/95 |
| 2007/0033854 | A1 * | 2/2007 | Ridge | 43/1 |
| 2007/0193614 | A1 * | 8/2007 | Egstad | 135/156 |
| 2011/0017251 | A1 * | 1/2011 | Overbaugh | 135/90 |

* cited by examiner

*Primary Examiner* — Jessica Laux

(74) *Attorney, Agent, or Firm* — Flynn, Thiel, Boutell & Tanis, P.C.

(57) ABSTRACT

A hunting blind including a front wall having an opening therethrough and a multi-position window covering the opening. The multi-position window includes a panel with an elongate aperture covered by a door pivotally connected to the panel. The multi-position window has a first position on the front wall and covering the opening wherein the elongate aperture extends vertically for hunting with a bow. The multi-position window has a second position on the front wall and covering the opening wherein the elongate aperture extends horizontally for hunting with a gun.

17 Claims, 4 Drawing Sheets

MULTI-POSITION HUNTING BLIND WINDOW

FIELD OF THE INVENTION

The present invention concerns hunting blinds, and more particularly relates to a multi-position window for a hunting blind.

BACKGROUND OF THE INVENTION

Hunting blinds are structures erected to provide cover and camouflage for a hunter during a hunt. Generally, blinds are erected in locations selected for the likelihood of spotting prey during a hunt. Hunting blinds can house a hunter hunting with a rifle or with a bow.

SUMMARY OF THE INVENTION

An aspect of the present invention is to provide a method of configuring a hunting blind for hunting with a gun and a bow. The method includes providing a structure having an opening, providing a panel with an elongate aperture covered by a door pivotally connected to the panel, positioning the panel over the opening in the structure with the elongate aperture extending vertically for hunting with the bow, and positioning the panel over the opening in the structure with the elongate aperture extending horizontally for hunting with the gun.

Another aspect of the present invention is to provide a hunting blind comprising a front wall having an opening therethrough and a multi-position window covering the opening. The multi-position window includes a panel with an elongate aperture covered by a door pivotally connected to the panel. The multi-position window has a first position on the front wall and covering the opening wherein the elongate aperture extends vertically for hunting with a bow. The multi-position window has a second position on the front wall and covering the opening wherein the elongate aperture extends horizontally for hunting with a gun.

Yet another aspect of the present invention is to provide a multi-position window for a hunting blind comprising a substantially square panel having a first portion, a second portion and an elongate aperture located centrally on the panel between the first portion and the second portion. The multi-position window also includes a door pivotally connected to the first portion of the substantially square panel. The substantially square panel has a first connection structure in each corner thereof. The multi-position window can be connected to the hunting blind in a first position wherein the first connection structures in each corner of the substantially square panel interact with second connection structures of the hunting blind with the elongate aperture extending horizontally for hunting with a gun. The multi-position window can be connected to the hunting blind in a second position wherein the first connection structures in each corner of the substantially square panel interact with second connection structures of the hunting blind with the elongate aperture extending vertically for hunting with a bow.

DETAILED DESCRIPTION OF THE PREFERRED EMBODIMENT

Figure 1:
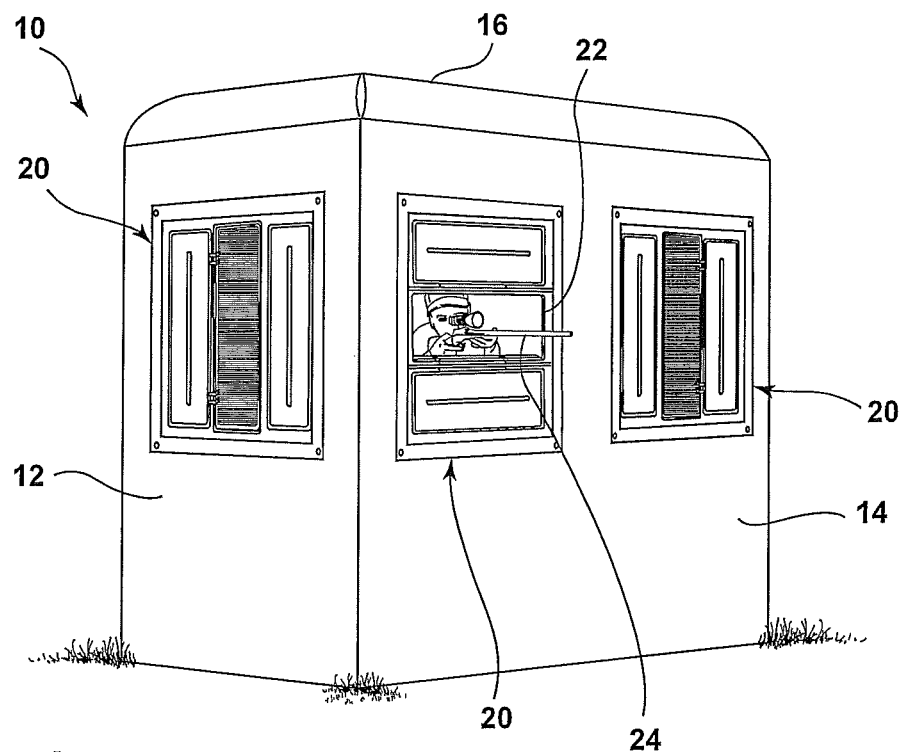
FIG. 1 is a perspective view of a hunting blind having a multi-position window in a first position for hunting with a rifle.
Figure 3:
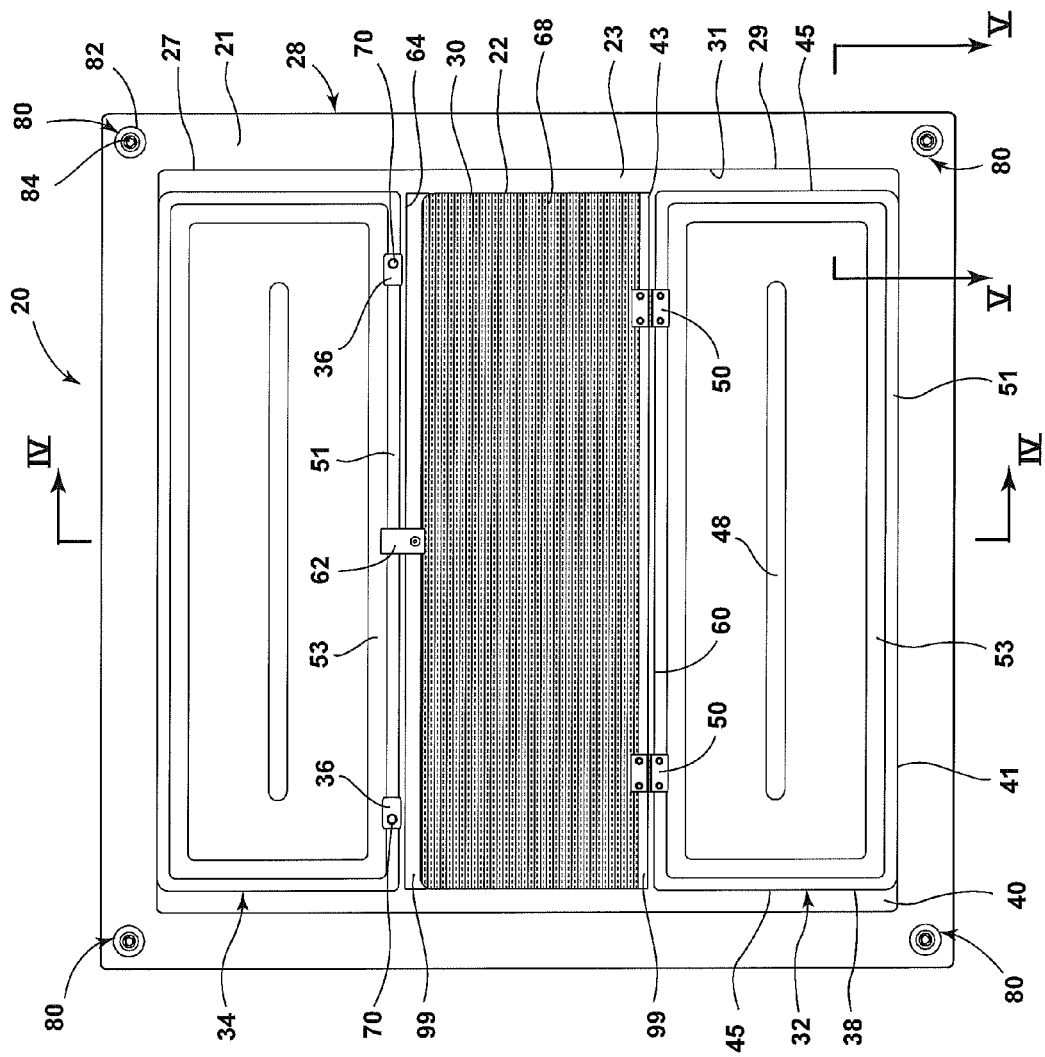
FIG. 3 is a front view of the multi-position window of the present invention.

For purposes of description herein, the terms "outer," "inner," "bottom," "vertical," "horizontal," and derivatives thereof shall relate to the invention as orientated in FIGS. 1 and 3. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts. Hence, specific dimensions and other physical characteristics relating to the embodiments disclosed herein are not to be considered as limiting.

The reference number 10 (FIG. 1) generally designates a hunting blind of the present invention. The hunting blind 10 includes a front wall 12 and can include side walls 14, a rear wall (not shown) and a roof 16. The hunting blind 10 can be located on the ground or can be elevated. The hunting blind 10 includes an opening 18 in the front wall 12. In the illustrated example, the opening 18 is substantially rectangular. However, it is contemplated that the opening 18 could have other configurations. A multi-position window 20 having an elongate aperture 22 is configured to be positioned over the opening 18 in the hunting blind 10 in a first configuration (FIG. 1) wherein the elongate aperture 22 is positioned horizontally for hunting with a gun 24 and in a second configuration (FIG. 2) wherein the elongate aperture 22 is positioned vertically for hunting with a bow 26.

The illustrated multi-position window 20 (FIGS. 3-5) is configured to be connected to the front wall 12 of the hunting blind 10. The multi-position window 20 includes a panel 28 having an outer rectangular rim 21 and a central plate 23, with the central plate 23 being connected to the outer rectangular rim 21 by an outer rectangular edge 27 extending substantially perpendicularly from an inner perimeter 29 of the outer rectangular rim 21 and an outer perimeter 31 of the central plate 23. The elongate aperture 22 is located in the central plate 23 between a first stepped section 32 and a second stepped section 34 of the panel 28. The first stepped section 32 and the second stepped section 34 also provide stability to the multi-position window 20. It is contemplated that the panel 28 could be formed of any material (e.g., plastic, wood, metal, etc.)

In the illustrated embodiment, the first stepped section 32 includes a door 30 pivotally attached thereto for selectively covering the elongate aperture 22 and the second stepped section 34 includes a pair of rotatable locking tabs 36 for locking the door 30 in a closed position (see FIGS. 3-5) to cover the elongate aperture 22. The first stepped section 32 includes an outer rectangular edge 38 extending substantially perpendicular to a face 40 of the central plate 23, with the outer rectangular edge 38 having a bottom edge portion 41 (in the orientation illustrated in FIG. 3) coplanar with the outer rectangular edge 27 along with a top edge portion 43 and side edge portions 45 spaced from the elongate aperture 22 and the outer rectangular edge 27, respectively. The first stepped section 32 includes an outer face 51 connected to the outer rectangular edge 38. The outer face 51 includes a reinforcing rectangular recessed portion 53 adjacent the periphery of the outer face 51 and an elongated reinforcing recessed portion 48 in a center area thereof for providing support to the first stepped section 32. In the illustrated embodiment, the first stepped section 32 and the second stepped section 34 are substantially identical (as outlined above and illustrated in FIGS. 3-5 or being flat or both having a different stepped configuration). However, the first stepped section 32 and the second stepped section 34 could have different configurations (e.g., one being stepped and one being flat).

Figure 4:
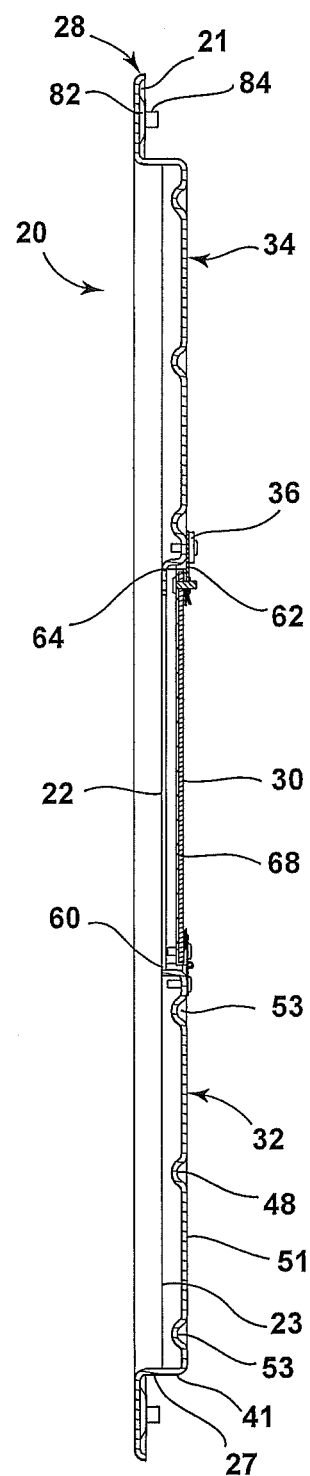
FIG. 4 is a side cross-sectional view of the multi-position window of the present invention taken along line IV-IV of FIG. 3.
Figure 5:
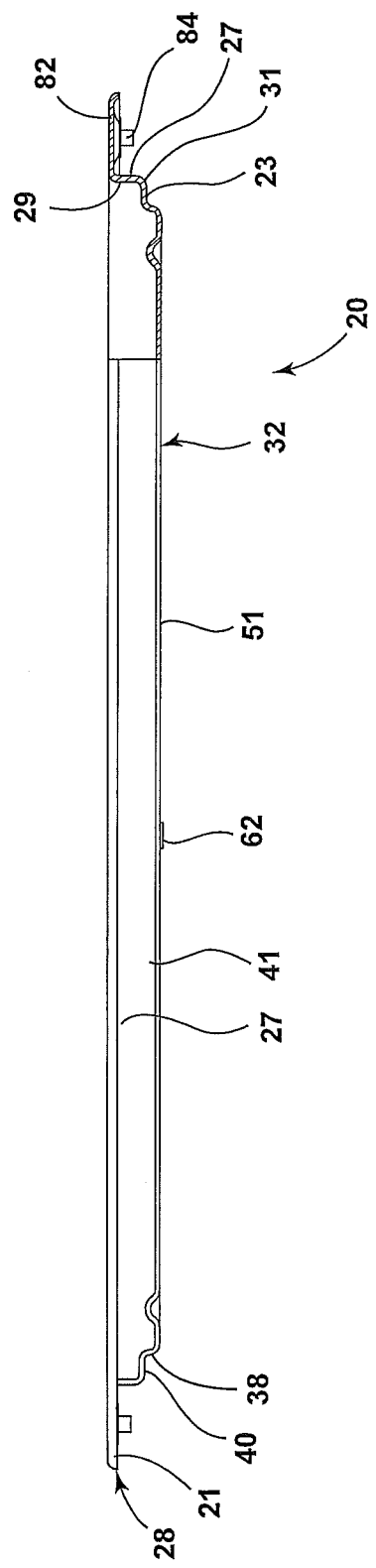
FIG. 5 is a bottom view of the multi-position window of the present invention, having a broken away section illustrating a cross-section view of the multi-position window taken along line V-V of FIG. 3.

The illustrated door 30 is pivotally connected to the first stepped section 32 of the panel 28 of the multi-position window 20. As illustrated in FIGS. 3-5, a pair of hinges 50 are connected to the outer face 51 of the first stepped section 32 adjacent a bottom edge 60 of the elongate aperture 22 in the multi-position window 20 between the bottom edge 60 and the reinforcing rectangular recessed portion 53 of the first stepped section 32. The door 30 includes a stop 62 connected to a top edge thereof adjacent a top edge 64 of the elongate aperture 22, with the stop 62 being configured to abut against the outer face 51 of the first stepped section 32 adjacent the top edge 64 of the opening between the elongate aperture 22 and the reinforcing rectangular recessed portion 53 of the second stepped section 34 to limit rotation of the door 30 in the closed position.

In the illustrated example, the door 30 is configured to be locked in a closed position. The pair of rotatable locking tabs 36 are connected to the outer face 51 of the second stepped section 34 adjacent the door 30, with the pair of rotatable locking tabs 36 being configured to be rotated to cover a rear face 68 of the door 30 when the door 30 is in the closed position to maintain the door 30 in the closed position. The rotatable locking tabs 36 each have a pin 70 extending through the outer face 51 of the second stepped section 34 adjacent the door 30, with the rotatable locking tabs 36 being configured to rotate about an axis parallel to a longitudinal axis of the pin 70. It is contemplated that the stop 62 can be elastic to force the door 30 towards the open position to provide a friction force against the rotatable locking tabs 36 when the rotatable locking tabs 36 cover the door 30 in the closed position. While not illustrated, it is contemplated that the multi-position window 20 could include latches or similar mechanisms for maintaining the door 30 in the open position.

In use, the multi-position window 20 is configured to be connected to the hunting blind 10 with the elongate aperture 22 positioned horizontally and over the opening 18 in the hunting blind 10 for hunting with the gun 24 (see FIG. 1). The multi-position window 20 can be connected to the front wall 12 of the hunting blind 10 and includes a plurality of connection areas 80 for connection to the front wall 12. In the illustrated example, the connection areas 80 are located in each corner of the outer rectangular rim 21 and include a recessed ring 82 surrounding a tube 84 for receiving a fastener therein for insertion through the tube 84 and into the front wall 12 of the hunting blind 10. With the multi-position window 20 in the configuration of FIG. 1 and the elongate aperture 22 positioned horizontally, the door 30 can be opened to allow a hunter within the hunting blind to easily shoot the gun 24. It is contemplated that the door 30 can be translucent or transparent for seeing prey through the door 30 without the requirement for the door 30 to be in an open position. For example, the door 30 could be made of tinted poleaxe glass. The door 30 could also be opaque (e.g., made of wood, plastic or metal) or be partially opaque and partially transparent or translucent (e.g., metal with a tinted pane of glass in the middle thereof). It is also contemplated that the door 30 could include a reinforcing structure 99 adjacent bottom and top edges thereof (e.g., metal rods or panels).

Figure 2:
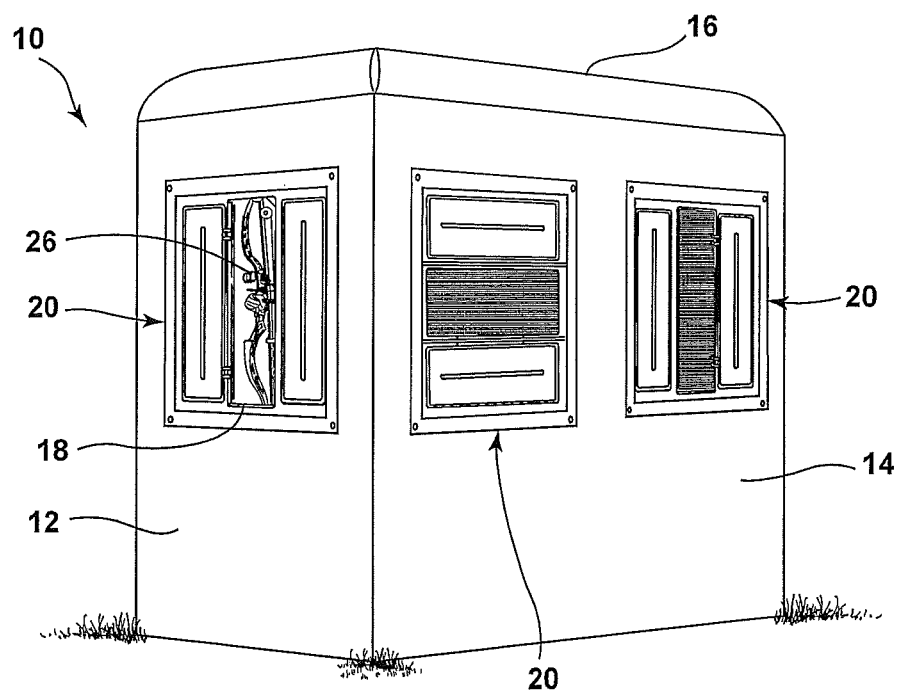
FIG. 2 is a perspective view of the hunting blind having the multi-position window in a second position for hunting with a bow.

The multi-position window 20 is also configured to be connected to the hunting blind 10 with the elongate aperture 22 positioned vertically and positioned over the opening 18 in the hunting blind 10 for easily hunting with the bow 26 (see FIG. 2). It is contemplated that the multi-position window 20 can be substantially square such that the connection areas 80 are in the same location in either the configuration of FIG. 1 or the configuration of FIG. 2.

The above description is considered that of the one embodiment only. Modification of the invention will occur to those skilled in the art and to those who make or use the invention. Therefore, it is understood that the embodiment shown in the drawings and described above is merely for illustrative purposes and not intended to limit the scope of the invention.

What is claimed is:

1. A method of configuring a hunting blind for hunting with a gun and a bow comprising:
   providing a rigid structure having an opening;
   providing a rigid panel with an elongate aperture covered by a door pivotally connected to the panel;
   positioning the panel over the opening in the structure with the elongate aperture extending vertically for hunting with the bow; and
   positioning the panel over the opening in the structure with the elongate aperture extending horizontally for hunting with the gun.

2. The method of configuring the hunting blind of claim 1, wherein:
   the panel has a square perimeter.

3. The method of configuring the hunting blind of claim 2, wherein:
   the panel has a first connection structure in each corner thereof;
   the structure has four second connection structures forming a square;
   the first connection structures interacting with the second connection structures to connect the panel to the structure with the elongate aperture extending horizontally and vertically.

4. The method of configuring the hunting blind of claim 1, wherein:
   the door is at least partially translucent.

5. The method of configuring the hunting blind of claim 4, wherein:
   the door is tinted glass.

6. A hunting blind comprising:
   a rigid front wall having an opening therethrough;
   a rigid multi-position window covering the opening, the multi-position window comprising a panel with an elongate aperture covered by a door pivotally connected to the panel;
   the multi-position window having a first position on the front wall and covering the opening wherein the elongate aperture extends vertically for hunting with a bow;
   the multi-position window having a second position on the front wall and covering the opening wherein the elongate aperture extends horizontally for hunting with a gun.

7. The hunting blind of claim 6, wherein:
   the multi-position window has a square perimeter.

8. The hunting blind of claim 7, wherein:
the multi-position window has a first connection structure in each corner thereof;
the front wall has four second connection structures forming a square;
the first connection structures interacting with the second connection structures to connect the multi-position window to the front wall with the elongate aperture extending horizontally or vertically.

9. The hunting blind of claim 6, wherein:
the door is at least partially translucent.

10. The hunting blind of claim 9, wherein:
the door is tinted glass.

11. A multi-position window for a hunting blind comprising:
a rigid substantially square panel having a first portion, a second portion and an elongate aperture located centrally on the substantially square panel between the first portion and the second portion;
a rigid door pivotally connected to the first portion of the substantially square panel;
the substantially square panel having a first connection structure in each corner thereof;
wherein the multi-position window can be connected to the hunting blind in a first position wherein the first connection structures in each corner of the substantially square panel interact with second connection structures of the hunting blind with the elongate aperture extending horizontally for hunting with a gun; and
wherein the multi-position window can be connected to the hunting blind in a second position wherein the first connection structures in each corner of the substantially square panel interact with the second connection structures of the hunting blind with the elongate aperture extending vertically for hunting with a bow.

12. The multi-position window of claim 11, wherein:
the door is at least partially translucent, 13. The multi-position window of claim 12, wherein:
the door is tinted glass.

14. The multi-position window of claim 11, wherein:
the door is pivotally connected to the first portion of the substantially square panel with a plurality of hinges.

15. The multi-position window of claim 11, wherein:
the first portion and the second portion of the substantially square panel have an identical configuration.

16. The multi-position window of claim 15, wherein:
the first portion and the second portion of the substantially square panel each have a plurality of recessed channels therein.

17. The multi-position window of claim 15, wherein:
the first connection structures each comprise a tube configured to be inserted into the hunting blind, with the tubes being configured to accept fasteners therein for connection to the hunting blinds.

\* \* \* \* \*